United States Patent
Verma et al.

(10) Patent No.: US 10,399,023 B2
(45) Date of Patent: Sep. 3, 2019

(54) HEPA FILTER AIRFLOW DISTRIBUTION SYSTEMS

(71) Applicant: Curium US LLC, St. Louis, MO (US)

(72) Inventors: Sumit Verma, Chesterfield, MO (US); Bryan S. Petrofsky, St. Louis, MO (US); Kevin B. Graves, Catawissa, MO (US); Donald W. Reese, Florissant, MO (US)

(73) Assignee: Curium US LLC, St. Louis, MO (US)

( * ) Notice: Subject to any disclaimer, the term of this patent is extended or adjusted under 35 U.S.C. 154(b) by 0 days.

(21) Appl. No.: 15/408,932

(22) Filed: Jan. 18, 2017

(65) Prior Publication Data

US 2018/0028956 A1    Feb. 1, 2018

Related U.S. Application Data

(60) Provisional application No. 62/369,443, filed on Aug. 1, 2016.

(51) Int. Cl.
| | |
|---|---|
| *B01D 53/22* | (2006.01) |
| *B01D 46/00* | (2006.01) |
| *B01D 46/52* | (2006.01) |
| *G21F 7/015* | (2006.01) |

(52) U.S. Cl.
CPC ....... *B01D 46/0005* (2013.01); *B01D 46/521* (2013.01); *G21F 7/015* (2013.01); *B01D 2279/51* (2013.01)

(58) Field of Classification Search
CPC ............ B01D 46/0004; B01D 2279/51; B01D 46/0005; B01D 46/521; B01D 46/0002; G21F 7/015
See application file for complete search history.

(56) References Cited

U.S. PATENT DOCUMENTS

| | | | | |
|---|---|---|---|---|
| 4,603,618 | A | | 8/1986 | Soltis |
| 4,685,944 | A | * | 8/1987 | Allan ............... B01D 46/0004 55/491 |
| 4,773,922 | A | | 9/1988 | Ross et al. |
| 4,790,332 | A | * | 12/1988 | Wallace ............... A24F 13/00 131/175 |
| 5,064,457 | A | * | 11/1991 | Weber ............... B08B 15/026 55/385.2 |
| 5,150,532 | A | * | 9/1992 | Aigo ............... F26B 5/08 34/187 |
| 5,238,477 | A | | 8/1993 | Layton |
| 5,413,450 | A | * | 5/1995 | Salsburg ............... B60P 1/64 414/401 |
| 5,549,512 | A | | 8/1996 | Sinclair et al. |

(Continued)

FOREIGN PATENT DOCUMENTS

DE    102014214418 A1    1/2016

OTHER PUBLICATIONS

International Search Report and Written Opinion of the International Searching Authority regarding PCT/US2017/013935 dated Apr. 21, 2017; pp. 13.

*Primary Examiner* — Anthony R Shumate
(74) *Attorney, Agent, or Firm* — Armstrong Teasdale LLP

(57) ABSTRACT

An air distribution system for supplying filtered air to isolator working volumes includes an inlet including a HEPA filter and an outlet including a slidably mounted sintered panel. Methods for supplying filtered air to an isolator working volume are also disclosed.

19 Claims, 4 Drawing Sheets

(56) References Cited

U.S. PATENT DOCUMENTS

| | | | | |
|---|---|---|---|---|
| 5,656,166 | A * | 8/1997 | Linnersten | B01D 29/012 210/489 |
| 5,688,297 | A * | 11/1997 | Spengler | B01D 46/0002 55/356 |
| 9,700,821 | B2 * | 7/2017 | Grider | B01D 46/0004 |
| 9,776,117 | B2 * | 10/2017 | Grider | B01D 46/0004 |
| 2002/0121196 | A1 * | 9/2002 | Thakur | B01D 46/0023 96/224 |
| 2007/0066215 | A1 * | 3/2007 | Song | B01D 46/0004 454/329 |
| 2008/0060163 | A1 * | 3/2008 | Tanaka | A47L 9/122 15/352 |
| 2010/0294397 | A1 | 11/2010 | Kishkovich et al. | |
| 2014/0144110 | A1 * | 5/2014 | Wood | A62B 19/00 55/482 |
| 2014/0260994 | A1 * | 9/2014 | Grider | B01D 46/0004 96/399 |
| 2016/0059169 | A1 * | 3/2016 | Cheng | B01D 46/0004 55/482 |

\* cited by examiner

HEPA FILTER AIRFLOW DISTRIBUTION SYSTEMS

CROSS-REFERENCE TO RELATED APPLICATION

This application claims priority to U.S. Provisional Application Ser. No. 62/369,443 filed on Aug. 1, 2016, which is incorporated in its entirety.

FIELD

The field of the disclosure relates generally to HEPA filter airflow distribution systems, and more particularly to such systems for isolator working volumes or radionuclide generators.

BACKGROUND

Shielded nuclear containment chambers, referred to as hot cells or isolators, are used in the radiopharmaceutical and nuclear energy industries to protect personnel from the radioactive material contained therein and radiation emitted therefrom. As used herein, hot cells and isolators are collectively referred to as isolators. In the radiopharmaceutical industry, radioactive material used for diagnostic and therapeutic purposes may be produced using a radionuclide generator, such as column housed in an isolator. Additionally, associated radionuclide process equipment is typically housed in an isolator. Air filters such as HEPA filters are used to provide pharmaceutical grade sterile filtered air to isolators, but current systems are not completely satisfactory. Accordingly, an improved system for HEPA filter airflow distribution is needed.

This Background section is intended to introduce the reader to various aspects of art that may be related to various embodiments and aspects of the present disclosure, which are described and/or claimed below. This discussion is believed to be helpful in providing the reader with background information to facilitate a better understanding of the various embodiments and aspects of the present disclosure. Accordingly, it should be understood that these statements are to be read in this light, and not as admissions of prior art.

SUMMARY

In one aspect, an air distribution system for supplying filtered air to an isolator working volume comprises an inlet including a HEPA filter, and an outlet including a slidably mounted sintered panel. The slidably mounted panel is positioned between the HEPA filter and the isolator working volume.

In other aspects, a method for supplying filtered air to an isolator working volume comprises filtering the air through a HEPA filter into a plenum chamber defined by the volume between (i) the outlet surface of the a HEPA filter, (ii) the inlet surface of a slidably mounted sintered panel, and (iii) the isolator walls. The slidably mounted sintered panel is positioned between the HEPA filter and the working volume of the isolator. The air pressure in the plenum chamber is greater than the air pressure in the isolator working volume.

In some other aspects of the disclosure, an air distribution system for supplying filtered air to an isolator working volume is provided. The system comprises: a HEPA filter for filtering air to the isolator; a track mounted between the HEPA filter and the working volume, and a sintered panel slidably mounted on the track; and a plenum defined by the volume between the HEPA filter outlet surface, the sintered panel inlet surface, and the isolator walls. The sintered panel being slidable between a first closed position directly under the HEPA filter, and a second open position enabling access to the HEPA filter.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the Figures.

DETAILED DESCRIPTION

Figure 1:
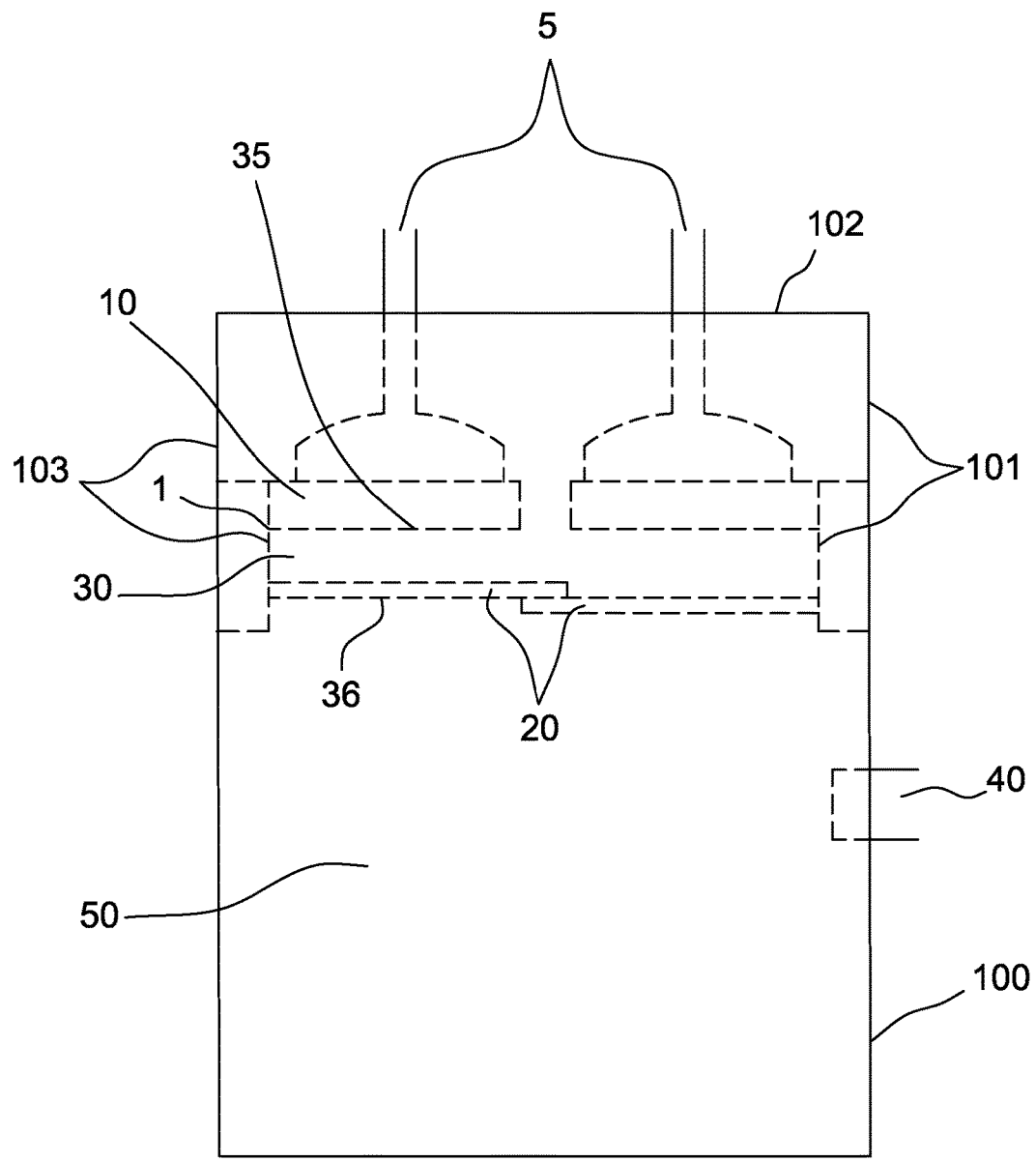
FIG. 1 is a cross section of an air distribution system of one embodiment.

Isolators are used to provide separation between a processing environment (e.g., an isolator working volume) and the environment external to the processing environment. Isolators typically comprise (i) gas (e.g. air) supply filtration and/or process gas (e.g., air) discharge filtration and (ii) a working volume containing process equipment or in-process materials. In some aspects, process gas may contain entrained liquid and/or solid particulate. In some aspects, the isolator prevents or mitigates contamination of the external environment with hazardous components from the working volume, such as radioactive material, chemical toxins and/or biological toxins. In some other aspects, the isolator prevents or mitigates contamination of the working volume with contaminants from the environment external to the working volume, such as microbes that could compromise the sterility of material in the working volume.

Radioactive material is used in nuclear medicine for diagnostic and therapeutic purposes by injecting a patient with a small dose of the radioactive material, which concentrates in certain organs or regions of the patient. Radioactive materials typically used for nuclear medicine include Technetium-99m, Indium-111, Thallium-201, and Strontium-89, among others.

Such radioactive materials may be produced using a radionuclide generator manufactured in a shielded nuclear containment chamber, referred to as a hot cell or isolator. Radionuclide generators generally include a column that has media for retaining a long-lived parent radionuclide that spontaneously decays into a daughter radionuclide that has a relatively short half-life. The column may be incorporated into a column assembly that has a needle-like outlet port that receives an evacuated vial to draw saline or other eluent liquid, provided to a needle-like inlet port, through a flow path of the column assembly, including the column itself. This liquid may elute and deliver daughter radionuclide from the column and to the evacuated vial for subsequent use in nuclear medical imaging applications, among other uses. Additionally, associated radionuclide process equipment is typically housed in the hot cell or isolator.

Hot cells or isolators, are used in the radiopharmaceutical and nuclear energy industries to shield and protect personnel from the radioactive material contained therein and radiation emitted therefrom. As used herein, hot cells and isolators are collectively referred to as isolators. Suitable shielding materials from which isolators may be constructed include, for example and without limitation, lead, depleted uranium, and tungsten. In some embodiments, isolators are constructed of steel-clad lead walls forming a cuboid or rectangular prism. In some embodiments, an isolator may include a viewing window constructed of a transparent shielding material. Suitable materials from which viewing windows may be constructed include, for example and without limitation, lead glass.

Air filters such as HEPA filters are used to provide pharmaceutical grade sterile filtered air to isolators. For instance, four HEPA filters may be used in a 2×2 matrix or six HEPA filters may be used in a 2×3 matrix. In some embodiments, air supply HEPA filters are positioned in the ceiling portion of the isolator and provide for a generally uniform and unidirectional flow of filtered air over a manufacturing area of the isolator. In accordance with the present disclosure, the isolator air supply further comprises a diffusion grid or membrane positioned between the outlet side of the HEPA filters and the isolator working volume thereby forming a plenum chamber that provides for improved air distribution as compared to HEPA filters alone. The diffusion grid or membrane is mounted such that it is allowed to slide to provide HEPA filter access.

Isolators often use a diffusion grid or membrane situated between the HEPA filters and the isolator working volume in order to create a full ceiling HEPA filtered unidirectional airflow. Such diffusion grids or membranes must be manually removed in order to access HEPA filters and perform HEPA filter certification and then reinstalled after certification is complete. Problematically, manually handling diffusion grids or membranes can cause damage to filters and the grids/membranes, and thereby increase testing time and thus process cycle time. Further, because of radiation in the isolator, manually removing diffusion grids may pose a safety risk.

FIG. 1 is a side view of an isolator 100 air distribution system 1 of the present disclosure. As shown, the air distribution system 1 generally comprises one or more HEPA filters 10 for filtering isolator supply air 5, a sliding panel grid 20 having sintered panels, where the HEPA filter 10 outlet surface, the sintered panel 20 inlet surface, and the isolator 100 walls 101, 102 and 103 define a plenum area or volume 30. The HEPA filters are each mounted in a frame (not depicted) and define the plenum inlet 35. The sliding panel grid 20 is mounted in a frame (not depicted), the frame comprising tracks affixed to isolator side walls for mounting the sintered panels, and the panels are slidable on the tracks. The sintered panels define the plenum outlet 36. As shown in FIG. 1, the plenum 30 is positioned above a manufacturing area 50 having a telemanipulator port 40 that allows an operator outside the hot cell environment (i.e., within the surrounding room or lab) to manipulate and transfer column assemblies within the isolator 100 environment with an automated, semi-automated or manually operated telemanipulator (not depicted) through the telemanipulator port. The isolator 100 may also have one or more ports for barcode scanner equipment, termed "barcode periscopes" (not depicted). Each radionuclide generator is labeled with a unique 2-dimensional barcode and the barcode is read prior to certain process steps in order to assure generator process control and traceability. Barcode scanner ports are positioned below the air distribution system 1.

Figure 2:
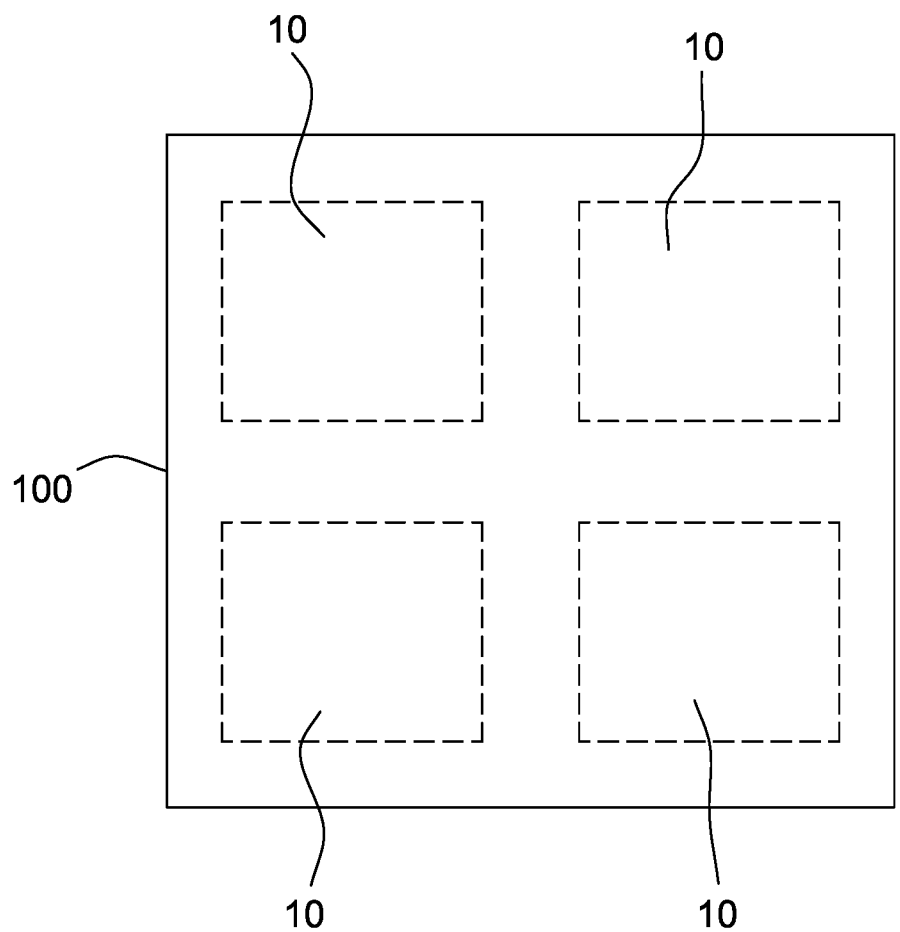
FIG. 2 is a top view of the system of FIG. 1.

FIG. 2 is a top view of is a top view of an isolator 100 HEPA filter housing assembly of the present disclosure depicting four HEPA filters 10 arranged in a 2×2 matrix. FIG. 2 is not limiting and other HEPA filter arrangements are within the scope of the present disclosure, for instance, one HEPA filter, two HEPA filters, and six HEPA filters arranged in a 2×3 matrix.

Figure 3:
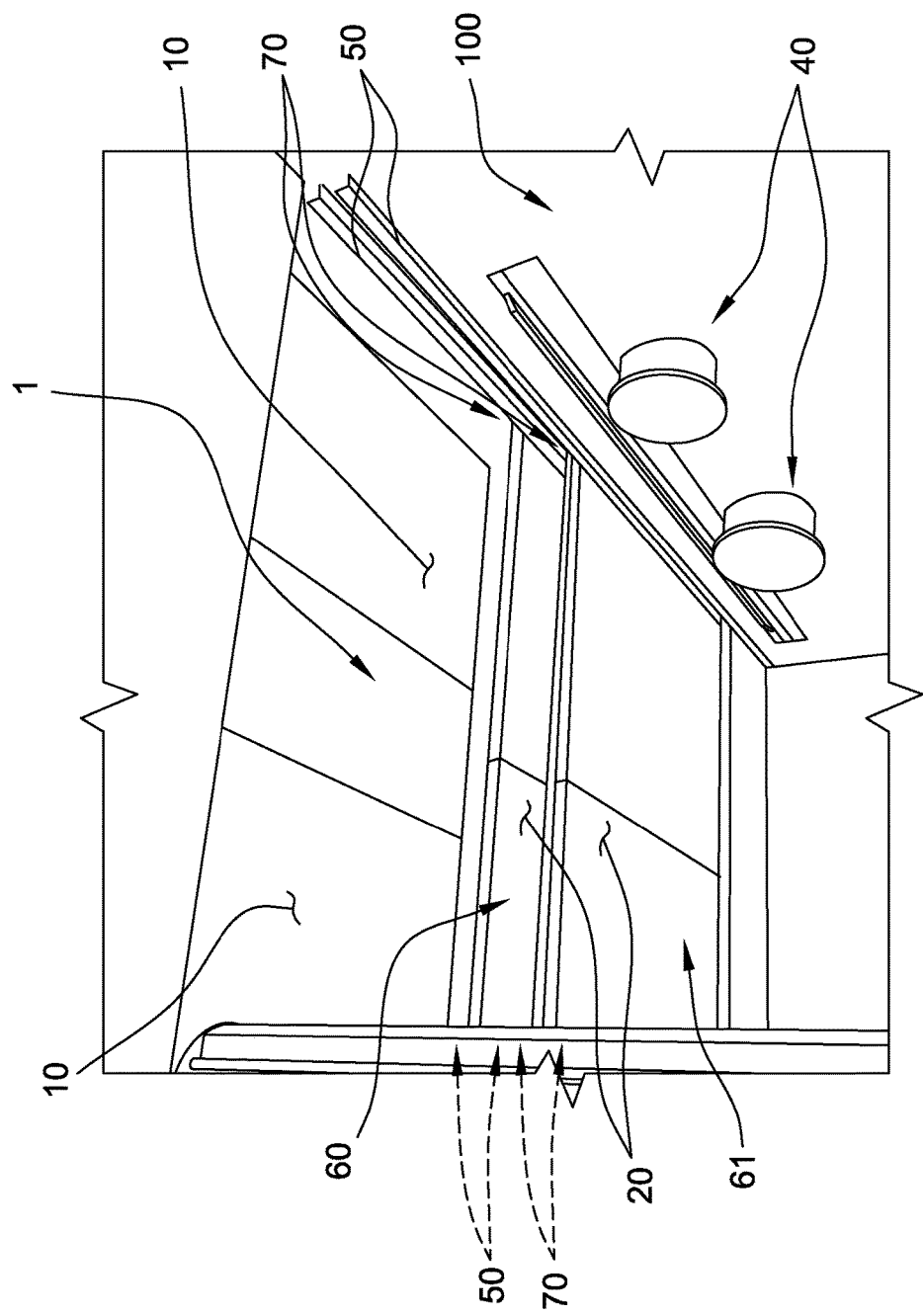
FIGS. 3 and 4 are perspective views of the air distribution system.

FIG. 3 is a perspective view of an air distribution system 1 of the present disclosure in a maintenance mode wherein one or more HEPA filters may be accessed from a hot cell door (not shown). HEPA filters 10 are suitably mounted in a frame (not shown) for filtering isolator 100 supply air. Two HEPA filters of a 2×2 matrix of four HEPA filters are depicted, but other arrangements of HEPA filters are within the scope of the present disclosure, for instance, one, two or six HEPA filters. As shown, the air distribution system includes a sliding panel grid 20 and formed from Panel 60 and Panel 61. Other arrangements of panels are within the scope of the present disclosure, including for example one slidable panel, three slidable panels, and four slidable panels. Each of Panel 60 and Panel 61 is mounted in a track 50, and the panels are slidable on the track. The volume defined by the HEPA filters 10 outlet surface, the inlet surface of the sliding panel grid 20, and the isolator side walls define a plenum chamber or plenum volume. The HEPA filters 10 define the plenum inlet and the sliding panel grid 20 defines the plenum outlet. The plenum chamber or plenum volume is positioned above a manufacturing area having a telemanipulator port 40 as described elsewhere herein. In any of the various aspects of the present disclosure, the sintered panels are mounted in tracks 50, and the panels are slidable on the tracks 50. In some aspects of the disclosure, as depicted in FIG. 3, the panels comprise slides 70 that are slidable on tracks 50. Any slide mount (i) suitable to allow diffuser panel movement with an external device and (ii) capable of forming a seal sufficient to maintain a higher, or positive, pressure in the plenum relative to the isolator manufacturing area is within the scope of the present disclosure. In some aspects, stainless steel inverted V groove slides on plastic runners may be used.

In embodiments including two or more panels, the tracks are positioned at different elevations within the isolator in order to allow the panels to slide under or over an adjacent panel such as depicted in FIG. 3. The slides of each panel are engaged with the track, and move along the track, thereby allowing for axial movement of each panel.

As previously described, the air distribution systems of the present disclosure include a plenum defined between the HEPA filters and the sintered panels. Supply air is filtered through the HEPA filter wherein the HEPA filter outlet surface defines the plenum inlet and wherein the sintered panel inlet surface defines the plenum outlet. HEPA filters are known in the art and generally include a rigid or semi-rigid frame and a sealed filter medium made of a continuous sheet of close spaced pleated media of randomly arranged fibers. One example of a suitable fiber is fiberglass. HEPA filters for radionuclide applications generally comply with ASME AG-1, FC-3000 or FK-3000. Suitable media provide for a maximum air velocity of 5.0 feet per minute and include folded filter media with corrugated separator and supports (Type A), minipleat media with glass ribbon or non-combustible thread separators (Type B), continuous corrugated filter media folded without separators (Type C), and filters that include glass or non-combustible thread separators (Type D).

Sintered panels are known in the art and may be constructed from sintered metal. In some aspects, the metal is stainless steel. In general, sintered metal membranes are formed from compressed and heated metal granules, powders or fibers thereby fusing the metal, in the essential absence of melting, in a porous network. Sintered air filters provide for uniform porosity, selectivity and precision, thereby creating uniform pressure drop and airflow across the filter face.

Figure 4:
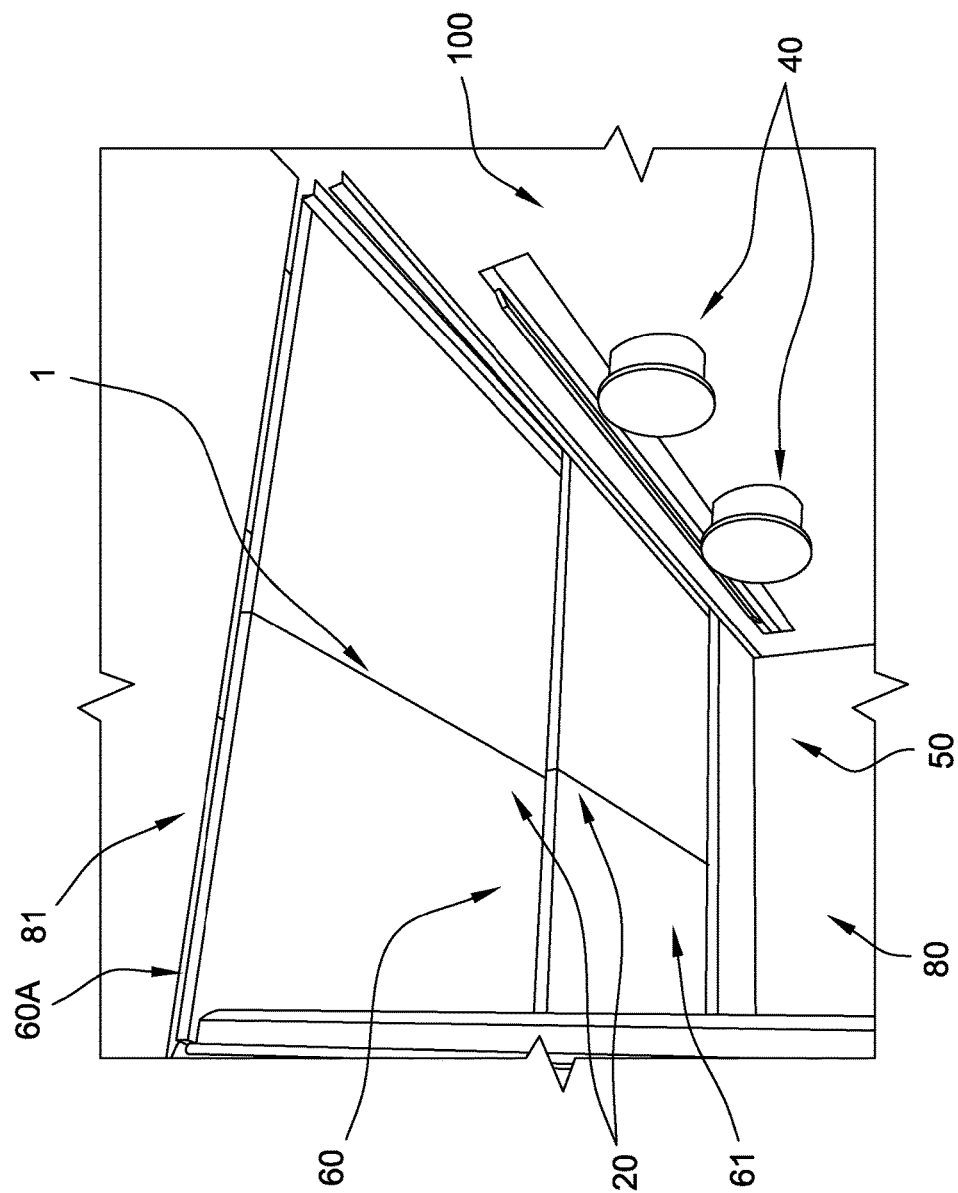

FIG. 4 is a perspective view of an isolator 100 air distribution system 1 of the present disclosure in a manufacturing mode where the sintered panels are in a closed position. Panel edge 61B of Panel 61 is sealably engaged with the isolator wall 1 80 and Panel edge 60A of Panel 60 is positioned such that the indicated Panel 60 edge 60A is sealably engaged against the isolator wall 2 81. Panel 60 and Panel 61 overlap and seal against one another. In some aspects, a seal between Panels A and B and between the panels and the isolator walls is achieved with silicone sealing strips, among other suitable materials.

Isolator manufacturing area pressure may be controlled at a negative or positive pressure relative to the surrounding environment and/or relative to adjacent process equipment. In some embodiments, the isolator manufacturing area pressure is controlled at negative pressure, such as from about −0.01 inches $H_2O$ to about −0.15 in$H_2O$. The plenum of the present disclosure operates at a higher, or positive, pressure relative to the isolator manufacturing area. The positive pressure zone in the plenum provides for an even airflow distribution over the entire surface area of the hot cell while also providing a protective barrier for the filters within the cell. Further, improved air distribution in the plenum created by the sintered panel grid allows for a reduced number of filters while still allowing full dispersion of clean air flow.

In a maintenance mode, the sintered panels may be positioned as indicated in FIG. 3 to allow access to the exposed row of HEPA filters. The panels may be positioned opposite to that depicted in FIG. 3 such that both panels are located proximate to an isolator wall thereby allowing access to the row of HEPA filters located above, and obscured by, Panel 60 and Panel 61 of FIG. 3. The slidable panels provide for full access to HEPA filters for integrity testing, repair or replacement without the need to remove grids, membranes, telemanipulators and/or barcode periscopes from the isolator.

The present disclosure includes methods of supplying a generally uniform and unidirectional flow of filtered air to an isolator, such as the hot cell of a radionuclide generator, using a plenum chamber defined by a volume between the outlet surface of one or more plenum inlet HEPA filters and the inlet surface of one or more plenum outlet sintered panels as described elsewhere herein, wherein the sintered panels are positioned between the HEPA filters and the hot cell working volume. The supply air is forced through the one or more HEPA filters and into the plenum chamber. The air pressure in the plenum chamber is greater than the air pressure in working volume of the hot cell. The filtered air passes through the sintered panels in an evenly distributed air flow over the entire hot cell working volume.

The sintered panels may be moved manually or automatically. For instance, the panels may be moved manually with an external device. In some embodiments, the panels may be operably connected to an automated mover. Examples of automated movers include a pneumatically actuated cylinder, such as a rodless cylinder as known in the art, and a motor-driven ball-screw apparatus as known in the art.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air distribution system for supplying filtered air to an isolator working volume, the system comprising:
   an inlet including a HEPA filter; and
   an outlet including a slidably mounted sintered panel,
   wherein the slidably mounted panel is positioned between the HEPA filter and the isolator working volume, and
   wherein the sintered panel is slidable between a first, closed position directly under the HEPA filter, and a second, open position enabling access to the HEPA filter.

2. The air distribution system of claim 1 further comprising tracks for mounting the sintered panel, the sintered panel being slidable on the track.

3. The air distribution system of claim 1 wherein the sintered panel is made of stainless steel.

4. The air distribution system of claim 1 wherein the isolator is a radionuclide generator hot cell.

5. The air distribution system of claim 4 wherein the hot cell includes a manufacturing area, and wherein the system is configured to provide uniform air flow over the manufacturing area.

6. A method for supplying filtered air to an isolator working volume, the method comprising:
   filtering the air through a HEPA filter into a plenum chamber defined by the volume between (i) an outlet surface of the HEPA filter, (ii) an inlet surface of a slidably mounted sintered panel, and (iii) walls of the isolator, wherein the slidably mounted sintered panel is positioned between the HEPA filter and the working volume of the isolator,
   controlling an air pressure in the plenum chamber to be greater than an air pressure in the isolator working volume.

7. The method of claim 6 wherein the isolator working volume is negatively pressurized and the plenum is positively pressurized.

8. The method of claim 6 wherein the sintered panel is made of stainless steel.

9. The method of claim 6 wherein the isolator is a radionuclide generator hot cell.

10. An air distribution system for supplying filtered air to an isolator working volume, the system comprising:
    a HEPA filter for filtering air to the isolator;
    a track mounted between the HEPA filter and the working volume, and a sintered panel slidably mounted on the track; and
    a plenum defined by the volume between the HEPA filter outlet surface, the sintered panel inlet surface, and the isolator walls, the sintered panel being slidable between a first closed position directly under the HEPA filter, and a second open position enabling access to the HEPA filter.

11. The air distribution system of claim 10 comprising a second HEPA filter, a second track mounted between the second HEPA filter and the working volume, and a second sintered panel slidably mounted on the second track, the second sintered panel being slidable between a first closed position directly under the second HEPA filter, and a second open position enabling access to the second HEPA filter.

12. The air distribution system of claim 10 wherein the isolator is a radionuclide generator hot cell.

13. The air distribution system of claim 1 comprising a second HEPA filter and a second slidably mounted sintered panel, wherein the second slidably mounted panel is positioned between the second HEPA filter and the isolator working volume.

14. The air distribution system of claim 2 comprising a second track for mounting a second sintered panel, the second sintered panel slidable on the track, wherein the second track is positioned at a different elevation than the track such that the second sintered panel is slidable under or over the sintered panel.

15. The method of claim 6 wherein the isolator walls are constructed of radiation shielding material.

16. The air distribution system of claim 10 wherein the sintered panel is made of stainless steel.

17. The air distribution system of claim 10 wherein the isolator walls are constructed of radiation shielding material.

18. The air distribution system of claim 11 wherein the sintered panel and the second sintered panel are made of stainless steel.

19. The air distribution system of claim 11 wherein the second track is positioned at a different elevation than the track such that the second sintered panel is slidable under or over the sintered panel.

* * * * *